US005996019A

United States Patent [19]

Hauser et al.

[11] Patent Number: 5,996,019
[45] Date of Patent: Nov. 30, 1999

[54] NETWORK LINK ACCESS SCHEDULING USING A PLURALITY OF PRIORITIZED LISTS CONTAINING QUEUE IDENTIFIERS

[75] Inventors: Stephen A. Hauser, Burlington, Mass.; Richard G. Bubenik, St. Louis, Mo.; Stephen A. Caldara, Sudbury, Mass.; Michael E. Gaddis, Defiance, Mo.; Thomas A. Manning, Northboro, Mass.; James M. Meredith, Westford, Mass.; Raymond L. Strouble, Westford, Mass.

[73] Assignees: Fujitsu Network Communications, Inc., Richardson, Tex.; Fujitsu Limited, Kawasaki, Japan

[21] Appl. No.: 08/683,127

[22] Filed: Jul. 18, 1996

Related U.S. Application Data

[60] Provisional application No. 60/001,498, Jul. 19, 1995, abandoned.
[51] Int. Cl.[6] .................................................. H04J 3/22
[52] U.S. Cl. .................................. 709/235; 370/429
[58] Field of Search ................................ 320/412, 437, 320/416, 418, 414, 429; 395/200.8, 200.62, 200.64, 200.65

[56] References Cited

U.S. PATENT DOCUMENTS

| 3,804,991 | 4/1974 | Hammond et al. | 179/26 |
| 3,974,343 | 8/1976 | Cheney et al. | 179/18 ES |
| 4,069,399 | 1/1978 | Barrett et al. | 179/15 AL |

(List continued on next page.)

FOREIGN PATENT DOCUMENTS 484943  3/1992  Japan .

OTHER PUBLICATIONS

An Ascom Timeplex White Paper, Meeting Critical Requirements with Scalable Enterprise Networking Solutions Based on a Unified ATM Foundation, pp. 1–12, Apr. 1994–Apr. 1995?

Douglas H. Hunt, ATM Traffic Management—Another Perspective, Business Communications Review, Jul. 1994.

Richard Bubenik et al., Leaf Initiated Join Extensions, Technical Committee, Signalling Subworking Group, ATM Forum/94–0325R1, Jul. 1, 1994.

Douglas H. Hunt et al., Flow Controlled Virtual Connections Proposal for ATM Traffic Management (Revision R2), Traffic Management Subworking Group, ATM_Forum/94–0632R2, Aug. 1994.

(List continued on next page.)

*Primary Examiner*—Dung C. Dinh
*Attorney, Agent, or Firm*—Weingarten, Schurgin, Gagnebin & Hayes LLP

[57] ABSTRACT

Methods and apparatus for scheduling cell transmission over a network link by a switch. The switch includes a plurality of queues associated with each link. Lists of queues are maintained for each link. In one embodiment, each link is associated with more than one type of list (with the list type corresponding to a scheduling category) and more than one prioritized list of each type (with the priority of the list corresponding to a quality of service). The scheduling lists are accessed to permit cell transmission from a queue contained therein in a predetermined sequence as a function of scheduling category, priority within a particular scheduling category and whether the bandwidth requirement for the particular scheduling category has been met. With this arrangement, maximum permissible delay requirements for each scheduling category are met.

20 Claims, 7 Drawing Sheets

U.S. PATENT DOCUMENTS

| | | | |
|---|---|---|---|
| 4,603,382 | 7/1986 | Cole et al. | 364/200 |
| 4,715,030 | 12/1987 | Koch et al. | 370/85 |
| 4,727,537 | 2/1988 | Nichols | 370/85 |
| 4,737,953 | 4/1988 | Koch et al. | 370/94 |
| 4,797,881 | 1/1989 | Ben-Artzi | 370/88 |
| 4,821,034 | 4/1989 | Anderson et al. | 340/825.8 |
| 4,837,761 | 6/1989 | Isono et al. | 370/60 |
| 4,849,968 | 7/1989 | Turner | 370/94 |
| 4,870,641 | 9/1989 | Pattavina | 370/60 |
| 4,872,159 | 10/1989 | Hemmady et al. | 370/60 |
| 4,872,160 | 10/1989 | Hemmady et al. | 370/60 |
| 4,878,216 | 10/1989 | Yunoki | 370/60 |
| 4,893,302 | 1/1990 | Hemmady et al. | 370/60 |
| 4,893,307 | 1/1990 | McKay et al. | 370/94.1 |
| 4,894,824 | 1/1990 | Hemmady et al. | 370/85.3 |
| 4,897,841 | 1/1990 | Gang, Jr. | 370/85.13 |
| 4,899,333 | 2/1990 | Roediger | 370/60 |
| 4,920,531 | 4/1990 | Isono et al. | 370/60 |
| 4,922,503 | 5/1990 | Leone | 370/85.13 |
| 4,933,938 | 6/1990 | Sheehy | 370/85.13 |
| 4,947,390 | 8/1990 | Sheehy | 370/85.13 |
| 4,953,157 | 8/1990 | Franklin et al. | 370/60 |
| 4,956,839 | 9/1990 | Torii et al. | 370/60 |
| 4,958,341 | 9/1990 | Hemmady et al. | 370/60.1 |
| 4,979,100 | 12/1990 | Makris et al. | 364/200 |
| 4,993,018 | 2/1991 | Hajikano et al. | 370/60 |
| 5,021,949 | 6/1991 | Morten et al. | 364/200 |
| 5,029,164 | 7/1991 | Goldstein et al. | 370/95.1 |
| 5,060,228 | 10/1991 | Tsutsui et al. | 370/85.13 |
| 5,067,123 | 11/1991 | Hyodo et al. | 370/58.1 |
| 5,070,498 | 12/1991 | Kakuma et al. | 370/60 |
| 5,083,269 | 1/1992 | Syobatake et al. | 395/650 |
| 5,084,867 | 1/1992 | Tachibana et al. | 370/60 |
| 5,084,871 | 1/1992 | Carn et al. | 370/94.1 |
| 5,090,011 | 2/1992 | Fukuta et al. | 370/60 |
| 5,090,024 | 2/1992 | Vander Mey et al. | 375/1 |
| 5,093,912 | 3/1992 | Dong et al. | 395/650 |
| 5,115,429 | 5/1992 | Hluchyj et al. | 370/84 |
| 5,119,369 | 6/1992 | Tanabe et al. | 370/60 |
| 5,119,372 | 6/1992 | Verbeek | 370/85.3 |
| 5,128,932 | 7/1992 | Li | 370/60 |
| 5,130,975 | 7/1992 | Akata | 370/60 |
| 5,130,982 | 7/1992 | Ash et al. | 370/85.7 |
| 5,132,966 | 7/1992 | Hayano et al. | 370/79 |
| 5,146,474 | 9/1992 | Nagler et al. | 375/10 |
| 5,146,560 | 9/1992 | Goldberg et al. | 385/200 |
| 5,150,358 | 9/1992 | Punj et al. | 370/84 |
| 5,151,897 | 9/1992 | Suzuki | 370/85.13 |
| 5,157,657 | 10/1992 | Potter et al. | 370/85 |
| 5,163,045 | 11/1992 | Caram et al. | 370/60.1 |
| 5,163,046 | 11/1992 | Hahne et al. | 370/79 |
| 5,179,556 | 1/1993 | Turner | 370/94.1 |
| 5,179,558 | 1/1993 | Thacker et al. | 370/94.3 |
| 5,185,743 | 2/1993 | Murayama et al. | 370/110.1 |
| 5,191,582 | 3/1993 | Upp | 370/94.1 |
| 5,191,652 | 3/1993 | Dias et al. | 395/200 |
| 5,193,151 | 3/1993 | Jain | 395/200 |
| 5,197,067 | 3/1993 | Fujimoto et al. | 370/94.1 |
| 5,198,808 | 3/1993 | Kudo | 340/825.8 |
| 5,199,027 | 3/1993 | Barri | 370/60 |
| 5,239,539 | 8/1993 | Uchida et al. | 370/58.3 |
| 5,253,247 | 10/1993 | Hirose et al. | 370/14 |
| 5,253,248 | 10/1993 | Dravida et al. | 370/16 |
| 5,255,264 | 10/1993 | Cotton et al. | 370/24 |
| 5,255,266 | 10/1993 | Watanabe et al. | 370/60.1 |
| 5,257,311 | 10/1993 | Naito et al. | 380/48 |
| 5,258,979 | 11/1993 | Oomuro et al. | 370/95.1 |
| 5,265,088 | 11/1993 | Takigawa et al. | 370/15 |
| 5,267,232 | 11/1993 | Katsube et al. | 370/17 |
| 5,268,897 | 12/1993 | Komine et al. | 370/60 |
| 5,268,900 | 12/1993 | Hluckyj et al. | 370/412 |
| 5,271,010 | 12/1993 | Miyake et al. | 370/94.1 |
| 5,272,697 | 12/1993 | Fraser et al. | 370/61 |
| 5,274,641 | 12/1993 | Shobatake et al. | 370/94.1 |
| 5,274,768 | 12/1993 | Traw et al. | 395/275 |
| 5,280,469 | 1/1994 | Taniguchi et al. | 370/13 |
| 5,280,470 | 1/1994 | Buhrke et al. | 370/13 |
| 5,282,201 | 1/1994 | Frank et al. | 370/94.1 |
| 5,283,788 | 2/1994 | Morita et al. | 370/110.1 |
| 5,285,446 | 2/1994 | Yonehara | 370/60.1 |
| 5,287,349 | 2/1994 | Hyodo et al. | 370/60.1 |
| 5,287,535 | 2/1994 | Sakagawa et al. | 370/60 |
| 5,289,462 | 2/1994 | Ahmadi et al. | 370/60.1 |
| 5,289,463 | 2/1994 | Mobasser | 370/68.1 |
| 5,289,470 | 2/1994 | Chang et al. | 370/94.1 |
| 5,291,481 | 3/1994 | Doshi et al. | 370/79 |
| 5,291,482 | 3/1994 | McHarg et al. | 370/60 |
| 5,295,134 | 3/1994 | Yoshimura et al. | 370/16 |
| 5,301,055 | 4/1994 | Bagchi et al. | 359/139 |
| 5,301,184 | 4/1994 | Uriu et al. | 370/60 |
| 5,301,190 | 4/1994 | Tsukuda et al. | 370/66 |
| 5,301,193 | 4/1994 | Toyofuku et al. | 370/94.1 |
| 5,303,232 | 4/1994 | Faulk, Jr. | 370/94 |
| 5,305,311 | 4/1994 | Lyles | 370/60 |
| 5,309,431 | 5/1994 | Tominaga et al. | 370/60 |
| 5,309,438 | 5/1994 | Nakajima | 370/94.1 |
| 5,311,586 | 5/1994 | Bogart et al. | 379/221 |
| 5,313,454 | 5/1994 | Bustini et al. | 370/13 |
| 5,313,458 | 5/1994 | Suzuki | 370/56 |
| 5,315,586 | 5/1994 | Charvillat | 370/60 |
| 5,319,638 | 6/1994 | Lin | 370/60 |
| 5,321,695 | 6/1994 | Proctor et al. | 370/60 |
| 5,323,389 | 6/1994 | Bitz et al. | 370/60.1 |
| 5,333,131 | 7/1994 | Tanabe et al. | 370/54 |
| 5,333,134 | 7/1994 | Ishibashi et al. | 370/94.1 |
| 5,335,222 | 8/1994 | Kamoi et al. | 370/60 |
| 5,335,325 | 8/1994 | Frank et al. | 395/200 |
| 5,339,310 | 8/1994 | Taniguchi | 370/60 |
| 5,339,317 | 8/1994 | Tanaka et al. | 370/85.15 |
| 5,339,318 | 8/1994 | Tanaka et al. | 370/110.1 |
| 5,341,366 | 8/1994 | Soumiya et al. | 370/17 |
| 5,341,373 | 8/1994 | Ishibashi et al. | 370/85.9 |
| 5,341,376 | 8/1994 | Yamashita | 370/99 |
| 5,345,229 | 9/1994 | Olnowich et al. | 340/825.8 |
| 5,350,906 | 9/1994 | Brody et al. | 235/379 |
| 5,355,372 | 10/1994 | Sengupta et al. | 370/60 |
| 5,357,506 | 10/1994 | Sugawara | 370/60 |
| 5,357,507 | 10/1994 | Hughes et al. | 370/60 |
| 5,357,508 | 10/1994 | Le Boudec et al. | 370/58.3 |
| 5,357,510 | 10/1994 | Norizuki et al. | 370/60.1 |
| 5,359,600 | 10/1994 | Ueda et al. | 370/60.1 |
| 5,361,251 | 11/1994 | Aihara et al. | 370/60 |
| 5,361,372 | 11/1994 | Rege et al. | 395/800 |
| 5,363,433 | 11/1994 | Isono | 379/92 |
| 5,371,893 | 12/1994 | Price et al. | 395/725 |
| 5,373,504 | 12/1994 | Tanaka et al. | 370/60.1 |
| 5,375,117 | 12/1994 | Morita et al. | 370/79 |
| 5,377,262 | 12/1994 | Bales et al. | 379/220 |
| 5,377,327 | 12/1994 | Jain et al. | 395/200 |
| 5,379,297 | 1/1995 | Glover et al. | 370/60.1 |
| 5,379,418 | 1/1995 | Shimazaki et al. | 395/575 |
| 5,390,170 | 2/1995 | Sawant et al. | 370/58.1 |
| 5,390,174 | 2/1995 | Jugel | 370/60 |
| 5,390,175 | 2/1995 | Hiller et al. | 370/60 |
| 5,392,280 | 2/1995 | Zheng | 370/60 |
| 5,392,402 | 2/1995 | Robrock, II | 395/200 |
| 5,394,396 | 2/1995 | Yoshimura et al. | 370/60 |
| 5,394,397 | 2/1995 | Yanagi et al. | 370/60.1 |
| 5,398,235 | 3/1995 | Tsuzuki et al. | 370/16 |
| 5,400,337 | 3/1995 | Munter | 370/60.1 |
| 5,402,415 | 3/1995 | Turner | 370/60 |
| 5,412,648 | 5/1995 | Fan | 370/60 |
| 5,414,703 | 5/1995 | Sakaue et al. | 370/60 |
| 5,420,858 | 5/1995 | Marshall et al. | 370/60.1 |
| 5,420,988 | 5/1995 | Elliott | 395/275 |
| 5,422,879 | 6/1995 | Parsons et al. | 370/60 |
| 5,425,021 | 6/1995 | Derby et al. | 370/54 |
| 5,425,026 | 6/1995 | Mori | 370/60 |
| 5,432,713 | 7/1995 | Takeo et al. | 364/514 |
| 5,432,784 | 7/1995 | Ozveren | 370/79 |

| | | | |
|---|---|---|---|
| 5,432,785 | 7/1995 | Ahmed et al. | 370/79 |
| 5,432,908 | 7/1995 | Heddes et al. | 395/250 |
| 5,436,886 | 7/1995 | McGill | 370/16 |
| 5,436,893 | 7/1995 | Barnett | 370/60.1 |
| 5,440,547 | 8/1995 | Easki et al. | 370/60 |
| 5,444,702 | 8/1995 | Burnett et al. | 370/60.1 |
| 5,446,733 | 8/1995 | Tsuruoka | 370/60.1 |
| 5,446,737 | 8/1995 | Cidon et al. | 370/85.5 |
| 5,446,738 | 8/1995 | Kim et al. | 370/94.2 |
| 5,448,559 | 9/1995 | Hayter et al. | 370/60.1 |
| 5,450,406 | 9/1995 | Esaki et al. | 370/60.1 |
| 5,452,296 | 9/1995 | Shimizu | 370/60.1 |
| 5,455,820 | 10/1995 | Yamada | 370/17 |
| 5,455,825 | 10/1995 | Lauer et al. | 370/60 |
| 5,457,687 | 10/1995 | Newman | 370/85.3 |
| 5,459,743 | 10/1995 | Fukuda et al. | 371/67.1 |
| 5,461,611 | 10/1995 | Drake, Jr. et al. | 370/54 |
| 5,463,620 | 10/1995 | Sriram | 370/60 |
| 5,465,331 | 11/1995 | Yang et al. | 395/200.08 |
| 5,475,679 | 12/1995 | Munter | 370/60.1 |
| 5,479,401 | 12/1995 | Bitz et al. | 370/60.1 |
| 5,479,402 | 12/1995 | Hata et al. | 370/60.1 |
| 5,483,526 | 1/1996 | Ben-Nun et al. | 370/60.1 |
| 5,485,453 | 1/1996 | Wahlman et al. | 370/16 |
| 5,485,455 | 1/1996 | Dobbins et al. | 370/60 |
| 5,487,063 | 1/1996 | Kakuma et al. | 370/56 |
| 5,488,606 | 1/1996 | Kakuma et al. | 370/16 |
| 5,491,691 | 2/1996 | Shtayer et al. | 370/61 |
| 5,491,694 | 2/1996 | Oliver et al. | 370/85.4 |
| 5,493,566 | 2/1996 | Ljungberg et al. | 370/60 |
| 5,497,369 | 3/1996 | Wainwright | 370/60 |
| 5,499,238 | 3/1996 | Shon | 370/60.2 |
| 5,504,741 | 4/1996 | Yamanaka et al. | 870/58.2 |
| 5,504,742 | 4/1996 | Kakuma et al. | 370/60.1 |
| 5,506,834 | 4/1996 | Sekihata et al. | 370/17 |
| 5,506,839 | 4/1996 | Hatta | 370/60 |
| 5,506,956 | 4/1996 | Cohen | 395/182.04 |
| 5,509,001 | 4/1996 | Tachibana et al. | 370/17 |
| 5,509,007 | 4/1996 | Takashima et al. | 370/60.1 |
| 5,513,134 | 4/1996 | Cooperman et al. | 365/49 |
| 5,513,178 | 4/1996 | Tanaka | 370/58.2 |
| 5,513,180 | 4/1996 | Miyake et al. | 370/60.1 |
| 5,515,359 | 5/1996 | Zheng | 370/13 |
| 5,517,495 | 5/1996 | Lund et al. | 370/60 |
| 5,519,690 | 5/1996 | Suzuka et al. | 370/17 |
| 5,521,905 | 5/1996 | Oda et al. | 370/17 |
| 5,521,915 | 5/1996 | Dieudonne et al. | 370/60.1 |
| 5,521,916 | 5/1996 | Choudhury et al. | 370/60.1 |
| 5,521,917 | 5/1996 | Watanabe et al. | 370/1 |
| 5,521,923 | 5/1996 | Willmann et al. | 370/94.1 |
| 5,523,999 | 6/1996 | Takano et al. | 370/58.2 |
| 5,524,113 | 6/1996 | Gaddis | 370/60.1 |
| 5,526,344 | 6/1996 | Diaz et al. | 370/16 |
| 5,528,588 | 6/1996 | Bennett et al. | 370/60 |
| 5,528,590 | 6/1996 | Iidaka et al. | 370/60.1 |
| 5,528,591 | 6/1996 | Lauer | 370/79 |
| 5,530,695 | 6/1996 | Dighe et al . | 370/17 |
| 5,533,009 | 7/1996 | Chen | 370/17 |
| 5,533,020 | 7/1996 | Byrn et al. | 370/60.1 |
| 5,535,196 | 7/1996 | Aihara et al. | 370/60 |
| 5,535,197 | 7/1996 | Cotton | 370/60 |
| 5,537,394 | 7/1996 | Abe et al. | 370/17 |
| 5,541,912 | 7/1996 | Choudhury et al. | 370/17 |
| 5,544,168 | 8/1996 | Jeffrey et al. | 370/60.1 |
| 5,544,169 | 8/1996 | Norizuki et al. | 370/60.1 |
| 5,544,170 | 8/1996 | Kasahara | 370/84 |
| 5,546,389 | 8/1996 | Wippenbeck et al. | 370/60 |
| 5,546,391 | 8/1996 | Hochschild et al. | 370/60 |
| 5,546,392 | 8/1996 | Boal et al. | 370/60.1 |
| 5,550,821 | 8/1996 | Akiyoshi | 370/60.1 |
| 5,550,823 | 8/1996 | Irie et al. | 370/60.1 |
| 5,553,057 | 9/1996 | Nakayama | 370/13 |
| 5,553,068 | 9/1996 | Aso et al. | 370/60 |
| 5,555,243 | 9/1996 | Kakuma et al. | 370/58.2 |
| 5,555,265 | 9/1996 | Kakuma et al. | 370/60 |
| 5,557,607 | 9/1996 | Holden | 370/58.2 |
| 5,568,479 | 10/1996 | Watanabe et al. | 370/60.1 |
| 5,570,361 | 10/1996 | Norizuki et al. | 370/60.1 |
| 5,570,362 | 10/1996 | Nishimura | 370/60.1 |
| 5,577,032 | 11/1996 | Sone et al. | 370/58.3 |
| 5,577,035 | 11/1996 | Hayter et al. | 370/60 |
| 5,583,857 | 12/1996 | Soumiya et al. | 370/233 |
| 5,583,858 | 12/1996 | Hanaoka | 370/392 |
| 5,583,861 | 12/1996 | Holden | 370/395 |
| 5,590,132 | 12/1996 | Ishibashi et al. | 370/236 |
| 5,602,829 | 2/1997 | Nie et al. | 370/235 |
| 5,610,913 | 3/1997 | Tomonaga et al. | 370/219 |
| 5,623,405 | 4/1997 | Isono | 395/230 |
| 5,625,846 | 4/1997 | Kobayakawa et al. | 395/872 |
| 5,633,861 | 5/1997 | Hanson et al. | 370/232 |

OTHER PUBLICATIONS

Flavio Bonomi et al., The Rate–Based Flow Control Framework for the Available Bit Rate ATM Service, IEEE Network, Mar./Apr. 1995, pp. 25–39.

R. Jain, Myths About Congestion Management in High Speed Networks, Internetworking Research and Experience, vol. 3, 101–113 (1992).

Douglas H. Hunt et al., Credit–Based FCVC Proposal for ATM Traffic Management (Revision R1), ATM Forum Technical Committee Traffic Management Subworking Group, ATM_Forum/94–0168R1, Apr. 28, 1994.

Douglas H. Hunt et al., Action Item Status for Credit–Based FCVC Proposal, ATM Forum Technical Committee Traffic Management Subworking Group, ATM_Forum/94–0439, Apr. 28, 1994.

Timothy P. Donahue et al., Arguments in Favor of Continuing Phase 1 as the Initial ATM Forum P–NNI Routing Protocol Implementation, ATM Forum Technical Committee, ATM Forum/94–0460, Apr. 28, 1994.

Richard Bubenick et al., Leaf Initiated Join Extensions, Technical Committee, Signalling Subworking Group, ATM Forum/94–0325, Apr. 28, 1994.

Rob Coltun et al., PRP: A P–NNI Routing Protocol Proposal, ATM Forum Technical Committee, ATM_Forum/94–0492, Apr. 28, 1994.

Richard Bubenik et al., Leaf Initiated Join Extensions, ATM Forum Technical Committee, Signalling Subworking Group, ATM Forum 94–0325, Apr. 28, 1994.

Richard Bubenik et al., Requirements For Phase 2 Signaling Protocol, ATM Forum Technical Committee, Signalling Subworking Group, ATM Forum 94–1078, Jan. 1, 1994.

SITA, ATM RFP: C–Overall Technical Requirements, Sep. 1994.

Head of Line Arbitration in ATM Switches with Input–Output Buffering and Backpressure Control. By Hosein F. Badren and H. T. Mouftah, Globecom '91, pp. 0347–0351.

H.T. Kung and K. Chang, Receiver–Oriented Adaptive Buffer Allocation in Credit–Based Flow Control For ATM Networks, Proceedings of INFOCOM '95, Apr. 2–6, 1995, pp. 1–14.

H.T. Kung, et al., Credit–Based Flow Control for ATM Networks: Credit Update Protocol, Adaptive Credit Allocation, and Statistical Multiplexing, Proceedings of ACM SIGCOMM '94 Symposium on Communications Architectures, Protocols and Applications, Aug. 31–Sep. 2, 1994, pp. 1–14.

NETWORK LINK ACCESS SCHEDULING USING A PLURALITY OF PRIORITIZED LISTS CONTAINING QUEUE IDENTIFIERS

RELATED CASE INFORMATION

This application claims benefit of U.S. Provisional Application Ser. No. 60/001,498, filed Jul. 19, 1995.

FIELD OF THE INVENTION

This invention relates generally to networks and, more specifically, to management of link access by an asynchronous transfer mode switch.

BACKGROUND OF THE INVENTION

Networks such as asynchronous transfer mode ("ATM") networks are used for transfer of audio, video and other data. ATM networks deliver data by routing data units such as ATM cells from source to destination through switches. Switches include input/output ("I/O") ports through which ATM cells are received and transmitted. The appropriate output port for transmission of the cell is determined based on the cell header.

In configuring a network element such as a switch for the optimal transfer of various traffic types (sometimes referred to as service classes) supported by ATM networks, multiple factors such as throughput delay and desired bandwidth must be considered. Such traffic types, each having its own delay and bandwidth requirements, include the constant bit rate ("CBR") service class, the variable bit rate ("VBR") service class, the available bit rate ("ABR") service class, and the unspecified bit rate ("UBR") service class.

The primary differentiator between the service classes is delay. Telecommunications network applications such as teleconferencing require deterministic delay bounds, and are typically assigned to the CBR service class. Transactions processing applications such as automated teller machines require a "tightly bounded" delay specification to provide acceptable response times. Such applications typically are assigned to the VBR service class. File transfer applications such as internetwork traffic merely require a "bounded" delay, and thus, typically employ the ABR service class. The UBR service class normally provides no delay bound.

Bandwidth is another consideration in establishing an acceptable switch configuration. Video applications typically have a predictable bandwidth requirement, while file transfer applications are much more aperiodic, or "bursty".

Low-delay and line utilization are opposing goals when multiplexing sources. High utilization is achieved by having a set of connections share bandwidth that is unused by connections that need very low delay. This shared bandwidth is known as dynamic bandwidth because it is distributed to connections based on instantaneous operating conditions. VBR, ABR and UBR utilize dynamic bandwidth to achieve high line utilization. The bandwidth used by connections that need very low delay is known as allocated bandwidth because it is dedicated to particular connections.

One way of scheduling traffic of different types is to use a priority scheme, in which certain traffic types are given higher transfer priority than others. The problem with such a priority arrangement is that higher priority traffic can prevent the transmission of lower priority traffic with acceptable delays.

SUMMARY OF THE INVENTION

Methods and apparatus for scheduling cell transmission over a link by a switch are described. The link scheduling permits delay requirements associated with different categories of transmission (i.e., scheduling categories) to be guaranteed. A plurality of queues are associated with and contend for access to each link supported by the switch. The queues contain pointers to cells to be transmitted over the link. Lists of queues associated with each link (i.e., scheduling lists) are maintained. More particularly, each link is associated with more than one type of list (with the list type corresponding to a scheduling category) and more than one prioritized list of each type (with the priority of the list corresponding to a quality of service).

The scheduling lists are accessed in a predetermined sequence in order to provide link access to the queue at the top of the respective list. The predetermined sequence with which the scheduling lists are accessed is a function of the scheduling category, priority of the list within the particular scheduling category and whether or not the respective bandwidth requirement (if any) for the scheduling category has been met. The bandwidth provided to the different scheduling categories over a predetermined interval is measured and compared to the respective bandwidth requirement. In this way, it is determined whether or not the respective bandwidth requirement for the scheduling category has been met.

In the present embodiment, the switch includes at least one input port containing input queues of cells received from the network, at least one output port containing queues for buffering cells to be transmitted from the switch and a switch fabric for permitting transmission of the cells from an input queue to one or more output queues. Each output port has a memory associated therewith for storing the lists of queues containing cells to be transmitted over a link supported by the port. In particular, a set of lists is stored for each link supported by the output port.

Each set of lists includes lists of more than one type, corresponding to different scheduling categories (i.e., allocated, dynamic VBR, dynamic ABR and dynamic UBR), and different priorities of lists within each scheduling category (i.e., corresponding to a particular quality of service). The lists are accessed in a predetermined order according to the priority of the respective scheduling categories as compared to other scheduling categories, the priority of the list as compared to other lists within the particular scheduling category, and whether or not the bandwidth requirement (if any) for the respective scheduling category has been met.

Each output port maintains a bandwidth table in memory for each output link supported by the port. The bandwidth table contains entries indicating the scheduling category associated with a predetermined number of prior cell transmissions. That is, each time a cell is transmitted, its scheduling category is entered into the bandwidth table for the link over which the cell was transmitted. Counters maintain a count of the number of bandwidth table entries of each scheduling category. The number of entries of a particular scheduling category is compared with the specified bandwidth requirement for that scheduling category in order to determine whether or not the bandwidth requirement has been met. This determination of whether or not the bandwidth requirement has been met is then used as one criteria for sequencing through the lists in order to provide the output queues with access to the respective link.

BRIEF DESCRIPTION OF THE DRAWINGS

The foregoing features of this invention, as well as the invention itself, may be more fully understood from the following detailed description of the drawings in which.

DESCRIPTION OF THE PREFERRED EMBODIMENT

Figure 1:
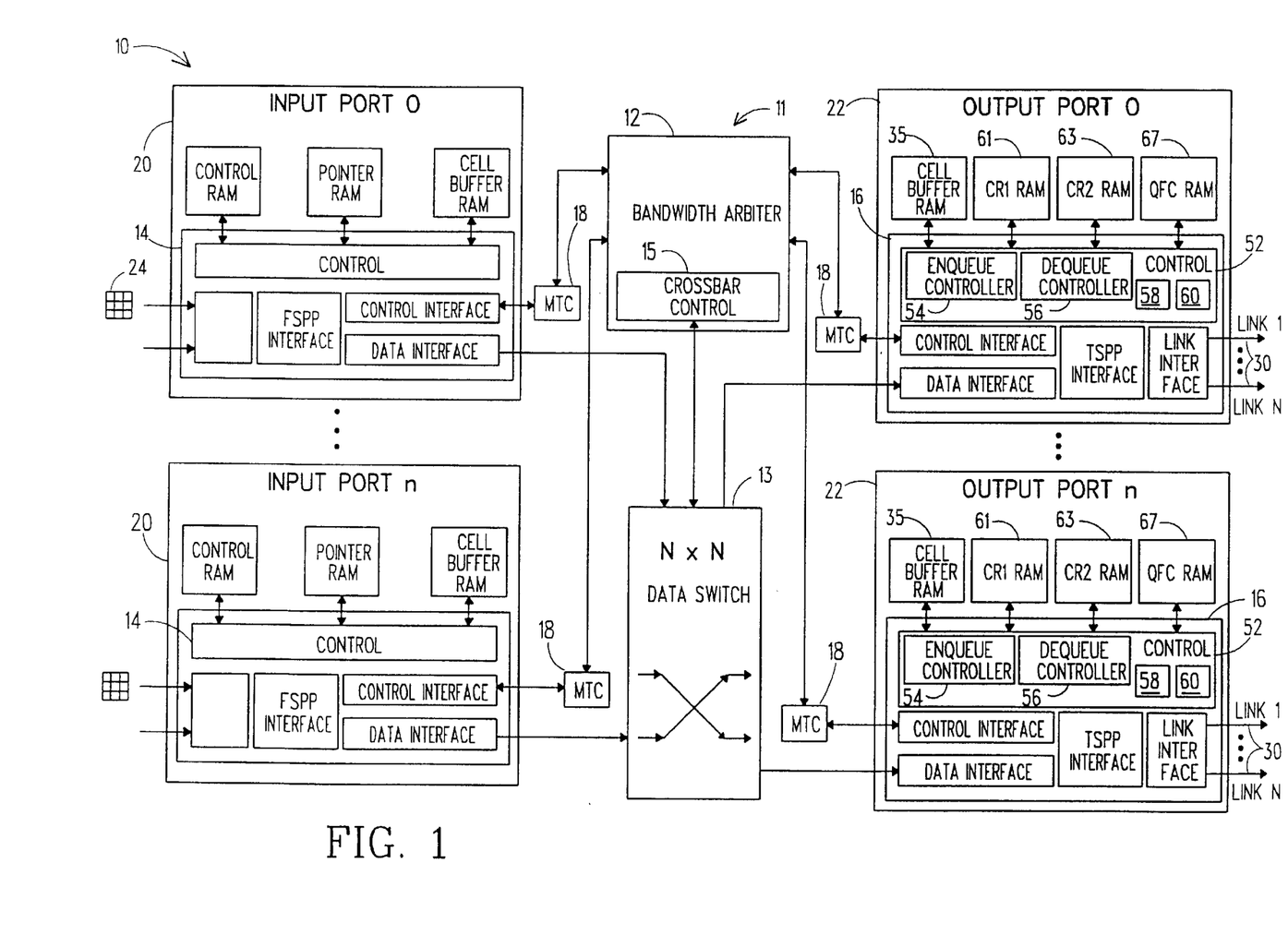
FIG. 1 is a block diagram of a network switch.
Figure 2:
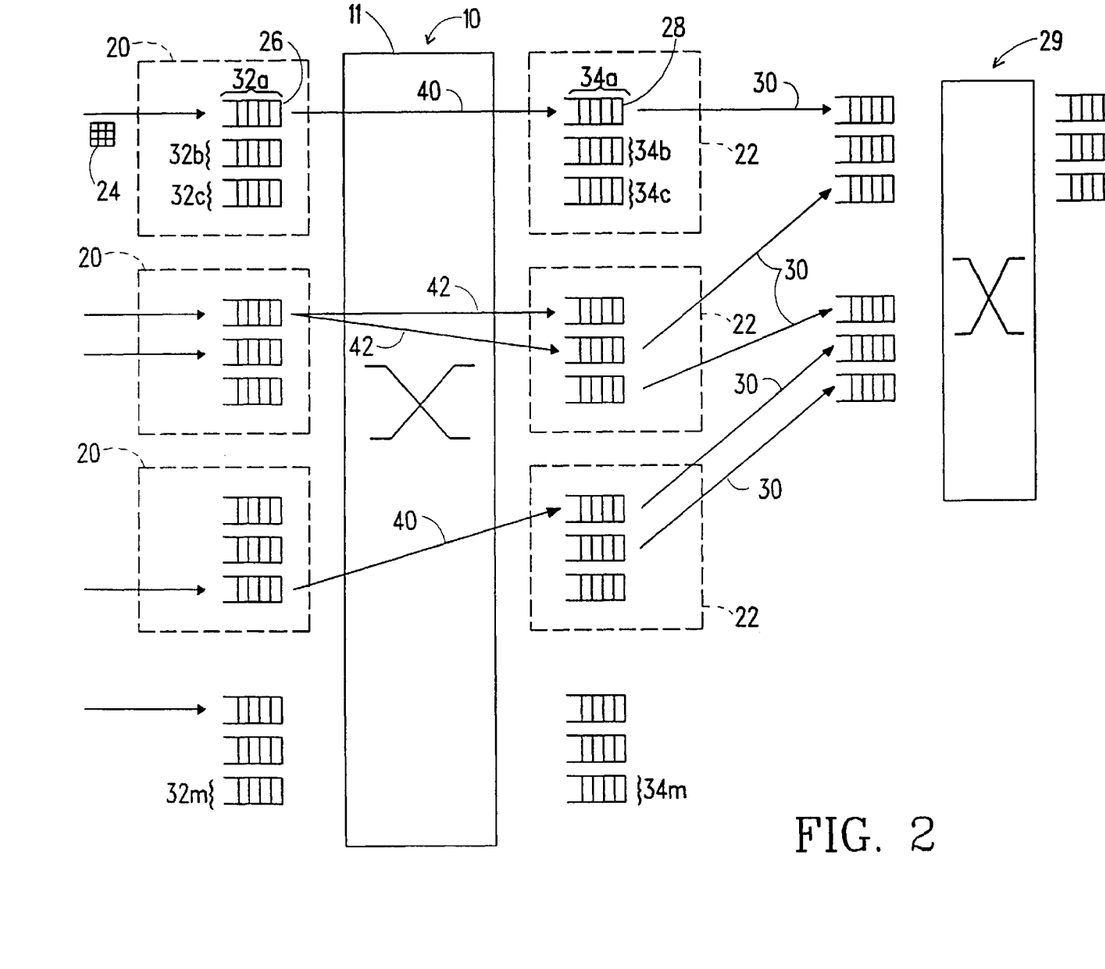
FIG. 2 is a block diagram illustrating switch port scheduling and network link scheduling.

Referring to FIGS. 1 and 2, the presently disclosed switch 10 includes a plurality of input ports 20, a plurality of output ports 22 and an N×N switch fabric 11, such as a cross point switch fabric, coupled between the input ports 20 and output ports 22. Each input port 20 includes a To Switch Port Processor ("TSPP") ASIC 14 and each output port 22 includes a From Switch Port Processor ("FSPP") ASIC 16. A Multipoint Topology Controller ("MTC") ASIC 18 is coupled between each TSPP 14 and a Bandwidth Arbiter ("BA") ASIC 12, as well as between the bandwidth arbiter 12 and each FSPP 16, as shown. In one embodiment, each MTC 18 supports up to four TSPPs 14 or FSPPs 16.

The switch fabric 11 includes a data crossbar 13 for data cell transport and the bandwidth arbiter 12 and MTCs 18 for control signal transport. The bandwidth arbiter 12 controls, inter alia, transport of data cells from a TSPP 14 to one or more FSPPs 16 through the data crossbar 13 (i.e., switch port scheduling). Each FSPP 16 receives cells from the data crossbar 13 and schedules transmission of those cells onto network links 30 (i.e., link scheduling).

Each of the input ports 20 and output ports 22 includes a plurality of input buffers 26 and output buffers 28, respectively (FIG. 2). The buffers 26, 28 are organized into a plurality of input queues 32a–m (referred to herein generally as input queues 32) and a plurality of output queues 34a–m (referred to herein generally as output queues 34), respectively. More particularly, each input port 20 includes a plurality of input queues 32 and each output port 22 includes a plurality of output queues 34, as shown. The input queues 32 are stored in a Control RAM and a Pointer RAM of the input port 20 and the output queues 34 are stored in a CR1 RAM 61 and a CR2 RAM 63 of the output port 22.

To traverse the switch 10, a data cell 24 enters the switch through an input port 20 and is enqueued on an input queue 32 at the respective TSPP 14. The cell is then transmitted from the input queue 32 to one or more output queues 34 via the data crossbar 13. Control signals are transmitted from a TSPP 14 to one or more FSPPs 16 via the respective MTC 18 and the bandwidth arbiter 12. In particular, data and control signals may be transmitted from an input queue 32 to a particular one of the output queues 34, in the case of a point to point connection 40. Alternatively, data and control signals may be transmitted from an input queue 32 to a selected set of output queues 34, in the case of a point to multipoint connection 42. From the output queue(s) 34, the data cell 24 is transmitted outside of the switch 10, for example, to another switch 29 via a network link 30.

The bandwidth arbiter 12 contains a crossbar controller 15 which includes a probe crossbar, an XOFF crossbar and an XON crossbar, each of which is an N×N switch fabric. A request message, or probe control signal, flows through the probe crossbar and is used to query whether or not sufficient space is available at the destination output queue, or queues 34 to enqueue a cell. The request message is considered a "forward" control signal since its direction is from a TSPP 14 to one or more FSPPs 16 (i.e., the same direction as data). A two bit control signal flows in the reverse direction (from one or more FSPPs to a TSPP) through the XOFF crossbar and responds to the request message query by indicating whether or not the destination output queue, or queues 34 are presently capable of accepting data cells and thus, whether or not the transmitting TSPP can transmit cells via the data crossbar 13. In the event that the XOFF control signal indicates that the queried output queue(s) 34 are not presently capable of receiving data, another reverse control signal, which flows through the XON crossbar, notifies the transmitting TSPP once space becomes available at the destination output queue(s) 34.

Each output port 22 contains four memories: a Control RAM 1 ("CR1 RAM") 61, a Control RAM 2 ("CR2 RAM") 63, a Cell Buffer RAM 35, and a Quantum Flow Control RAM ("QFC RAM") 67. The Cell Buffer RAM 35 is where the actual cells are buffered while they await transmission. The CR1 RAM 61 and the CR2 RAM 63 contain the output queues 34, with each queue 34 containing pointers to cells in the Cell Buffer RAM 35 (i.e., the queues may be described generally as containing cells). The CR1 RAM 61 contains information required to implement scheduling lists used to schedule link access by the output queues 34 associated with each link 30 supported by the FSPP 16, as will be discussed. The QFC RAM 67 stores update information for transfer to another switch 29 via a network link 30. Update cells are generated in response to the update information provided by a TSPP 14 and specify whether the particular TSPP 14 is presently capable of accepting data cells.

Each FSPP 16 supports N network links 30. In one example, the number N of network links 30 supported by each FSPP 16 is between one and eight. The FSPP 16 contains up to 16,384 output queues 34 associated with each of the supported links 30 with such output queues contending for access to the link. The process of giving the queues 34 associated with a particular link 30 access to transmit cells over the respective link 30 is referred to as "link scheduling". Link scheduling is performed by a control portion 52 of the FSPP 16 and, in particular, by an enqueue controller 54 and a dequeue controller 56.

Cells may be transferred from output queues 34 to links 30 using bandwidth assigned specifically to such connections ("allocated bandwidth") or using unallocated bandwidth or unused allocated bandwidth ("dynamic bandwidth"). Dynamic bandwidth is further broken down to be shared among different service classes (i.e., the Variable Bit Rate "VBR" service class, the Available Bit Rate "ABR" service class, and the Unspecified Bit Rate "UBR" service class). The different service classes are differentiated by delay and cell loss characteristics. In particular, the ABR service class guarantees a predetermined minimum transmission bandwidth rate (which can be expressed as a minimum percentage of the particular link 30) with no cell loss, the VBR service class guarantees only a predetermined minimum transmission bandwidth rate and the UBR service class has neither a minimum bandwidth rate nor a no cell loss guarantee.

In the illustrative embodiment, four scheduling categories are supported: one allocated bandwidth scheduling category and three types of dynamic bandwidth scheduling categories. The three types of dynamic bandwidth scheduling categories are used by the three service classes: VBR, ABR and UBR. Also associated with each scheduling category (i.e., allocated, dynamic ABR, dynamic VBR and dynamic UBR) are priorities which correspond to a particular quality of service. In the illustrative embodiment, the priorities associated with each scheduling category are between zero and three, with zero being the highest priority.

The scheduling category associated with a particular cell is determined from the header of a cell 24. An output queue 34 may contain either allocated cells, dynamic cells or both allocated and dynamic cells. However, a queue containing dynamic cells will contain dynamic cells associated with only one service class (i.e., VBR, ABR or UBR).

Figure 3:
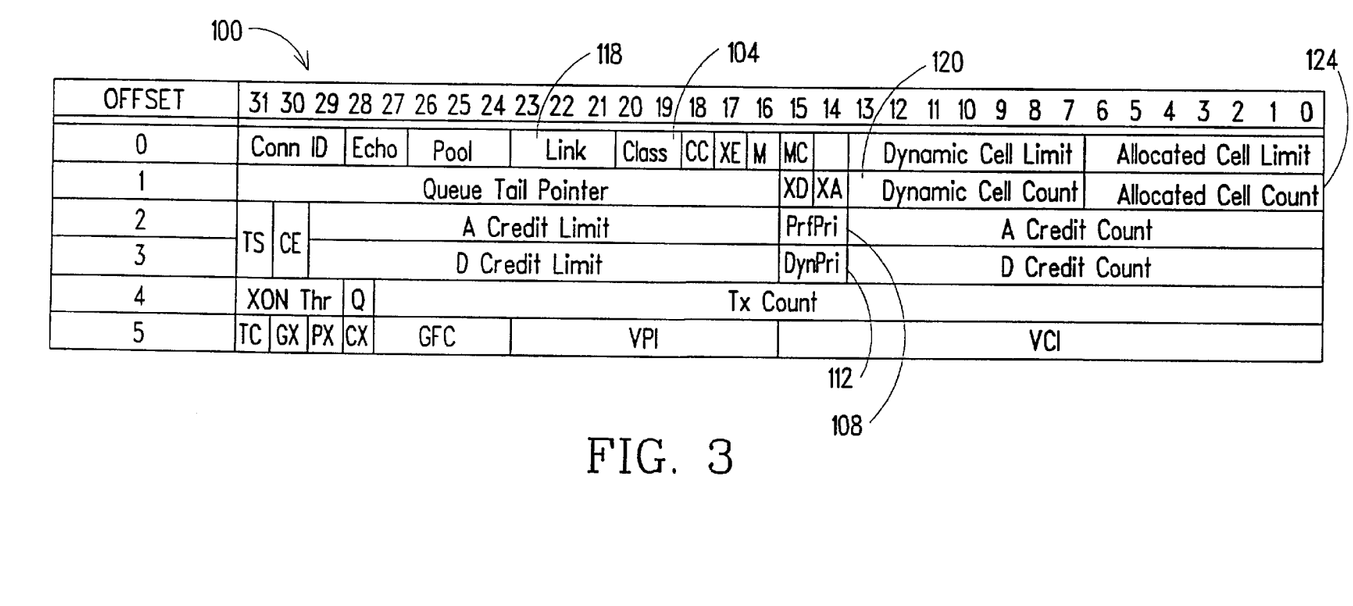
FIG. 3 illustrates the structure of a queue descriptor associated with an output queue of the switch of FIG. 1.

Referring also to FIG. 3, each output queue 34 has a queue descriptor 100 associated therewith which is stored in the CR2 RAM 63 of the output port 22. The queue descriptor 100 specifies, inter alia, the service class associated with dynamic cells buffered by the queue (i.e., ABR, VBR, or UBR) in a Class field 104. The priority of cells within a scheduling category is specified by a PrfPri field 108 for allocated bandwidth cells and by a DynPri field 112 for dynamic bandwidth cells. Also contained in the queue descriptor 100 is a Link field 118 in which the particular link 30 associated with the queue 34 is identified.

Figure 4:
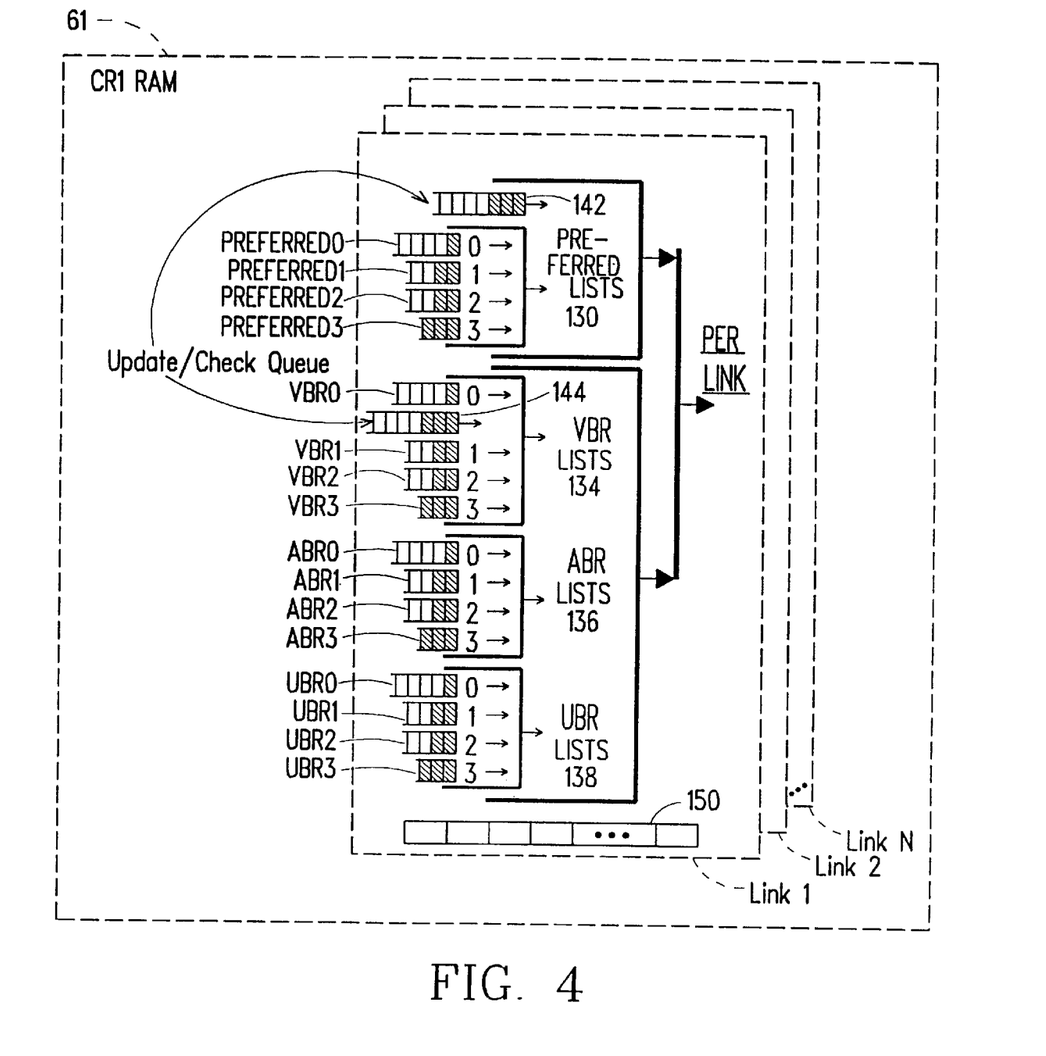
FIG. 4 illustrates the scheduling lists and bandwidth measurement table associated with each link of a particular FSPP.

Referring also to FIG. 4, lists of queues (i.e., scheduling lists) are maintained in the CR1 RAM 61 associated with each FSPP 16 for the purpose of link scheduling. In particular, a separate set of lists is provided for each link 30 supported by the FSPP 16. Specifically, for each link 30, the following lists are stored: four priorities of preferred lists 130 (labelled PREFERRED0, PREFERRED1, PREFERRED2 and PREFERRED3) for allocated cells, four priorities of VBR lists 134 (labelled VBR0, VBR1, VBR2 and VBR3) for dynamic VBR cells, four priorities of ABR lists 136 (labelled ABR0, ABR1, ABR2 and ABR3) for dynamic ABR cells and four priorities of UBR lists 138 (labelled UBR0, UBR1, UBR2 and UBR3) for dynamic UBR cells. Also stored for each link 30 supported by the FSPP 16 is a pair of update/check queues 142, 144 for use in scheduling flow control update cells for transmission to other network elements, as will be described.

Queue numbers of queues 34 containing allocated bandwidth cells are placed on one of the preferred lists 130 and queue numbers of queues 34 containing dynamic bandwidth cells are placed on one of the dynamic lists 134, 136, or 138. More particularly, an output queue 34 may be scheduled on one or more lists depending on the scheduling category of cells contained therein. An output queue 34 is scheduled on only one list if the queue contains either only allocated cells or only dynamic cells. If an output queue 34 contains both allocated and dynamic cells however, the queue is scheduled on more than one list (i.e., on a preferred list 130 for the allocated cells and on one of the dynamic lists 134, 136 or 138 for the dynamic cells). For example, a queue 34 containing allocated cells and dynamic VBR cells is serviced using both a preferred list 130 as well as a dynamic VBR list 134. As will become apparent from the particular sequence with which the lists are scheduled as discussed below, the criteria on which a list is scheduled includes the scheduling category (e.g., entries on the preferred lists are serviced before entries on the dynamic lists), the priority of the list within the particular scheduling category (e.g., a priority zero list is scheduled before a priority one, two or three list) and whether or not the bandwidth requirement (if any) for the particular scheduling category has been met.

Figure 5:
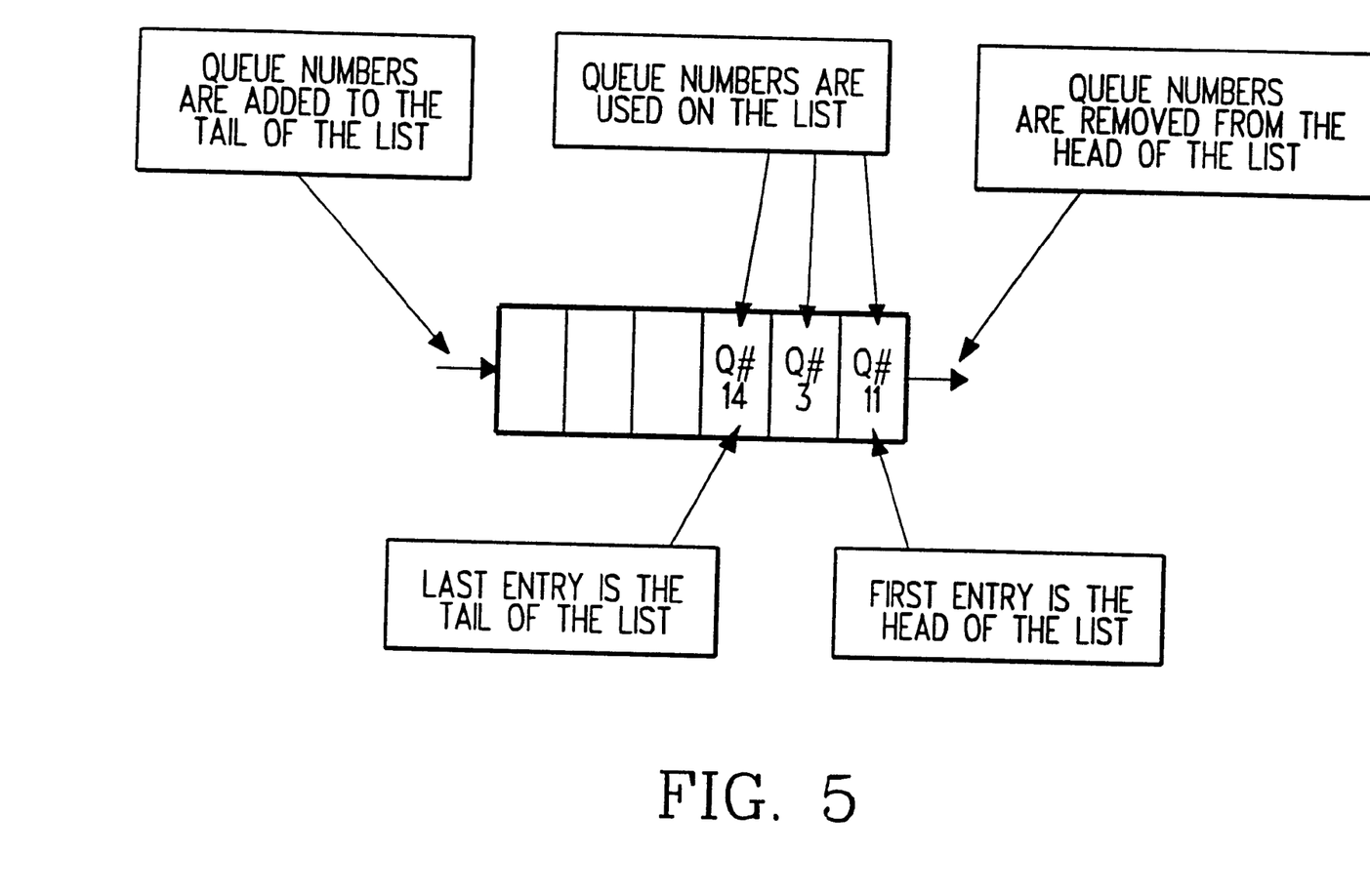
FIG. 5 illustrates the logical construction of a list.

Referring also to FIG. 5, within each list, the queue numbers are serviced in order of arrival, with the first queue number added to the list (i.e., the head of the list) being the first to be removed. When a queue number reaches the head of the particular list, that queue becomes the next queue within the list from which a cell is transmitted. When the cell is dequeued, or transmitted, the dequeue controller 56 (FIG. 1) causes the number of the transmitting queue to be removed from the head of the list and a cell count maintained in the queue descriptor 100 to be decremented. In particular, the queue descriptor 100 includes a Dynamic Cell Count field 120 and an Allocated Cell Count field 124. If the transmitted cell is an allocated cell, then the Allocated Cell Count 124 (FIG. 3) is decremented and, if the transmitted cell is a dynamic cell, then the Dynamic Cell Count 120 is decremented. If the cell count value thereafter is non-zero, then the queue number is returned to the tail of the list since a non-zero cell count value indicates that the particular queue still contains cells of the respective scheduling category and priority. Alternatively, if the decremented cell count value is zero, then the queue is removed from the list, since that queue no longer contains cells of the particular scheduling category and priority associated with that list. By servicing the queue number at the head of the list first, and returning a serviced queue to the tail of the list, queues within a list are scheduled in round-robin fashion.

The lists are implemented as linked lists of queue numbers identifying the queues 34. The queue numbers in a list are "linked" in the sense that each queue number points to another queue number on the list using the queue number itself as a pointer, as will be described further below in conjunction with FIG. 7.

The lists are loaded by the enqueue controller 54 (FIG. 1) each time a cell is received by the FSPP 16. When a cell is enqueued in an output queue 34, the cell count maintained in the queue descriptor 100 for the cell's scheduling category is incremented and the queue number is placed on the appropriate list (unless the queue is already on that list). Thus, each time a cell having dynamic bandwidth is enqueued, the Dynamic Cell Count 120 is incremented and each time a cell having allocated bandwidth is enqueue, the Allocated Cell Count 124 is incremented. Note that each time a cell is dequeued, the respective count (i.e., the Dynamic Cell Count 120 or the Allocated Cell Count 124) of the queue descriptor 100 is decremented.

Once the cell is enqueued on a queue 34 and the respective count field 120, 124 incremented, it is determined whether the queue should be placed on a scheduling list. In general, if the queue 34 is already on the appropriate list (i.e., the list corresponding to the scheduling category and priority of the just enqueued cell), then the queue 34 is not placed on the list again. Alternatively, if the queue is not on the appropriate list, then the queue is added to the list.

The way in which it is determined whether the queue 34 is already on the appropriate list is by checking the cell count 120, 124 associated with the enqueued cell. For example, before a dynamic bandwidth cell is enqueued on an output queue 34, the Dynamic Cell Count field 120 in the queue descriptor 100 is evaluated to determine if the count is zero. If the count is zero, then the queue 34 did not previously contain any dynamic bandwidth cells and the queue 34 is put on the appropriate dynamic bandwidth list 134, 136, or 138. Similarly, before an allocated cell is enqueued, the Allocated Cell Count is evaluated. An Allocated Cell Count of zero indicates that the queue 34 does not contain any other allocated bandwidth cells causing the queue to be added to the appropriate preferred list 130. Alternatively, if the cell count is non-zero, then the queue 34 is not put on any list, since a non-zero cell count indicates that the queue 34 contains other cells of the same category and priority and thus, that the queue is already on the appropriate list. An alternative embodiment may utilize a state bit to indicate whether the queue 34 is on or off a list.

As noted above, the scheduling lists are accessed in a predetermined order by the FSPP 16 based on scheduling category and priority, as well as on the basis of whether the bandwidth requirement associated with the particular scheduling category has been satisfied. To this end, the bandwidth provided to each scheduling category is measured with the use of a bandwidth table 150 (FIG. 4). The FSPP 16 stores a bandwidth table 150 for each supported link 30. The bandwidth table 150 maintains a "running average" of the scheduling categories transmitted over a predetermined interval (i.e., a predetermined number of cell times).

Figure 6:
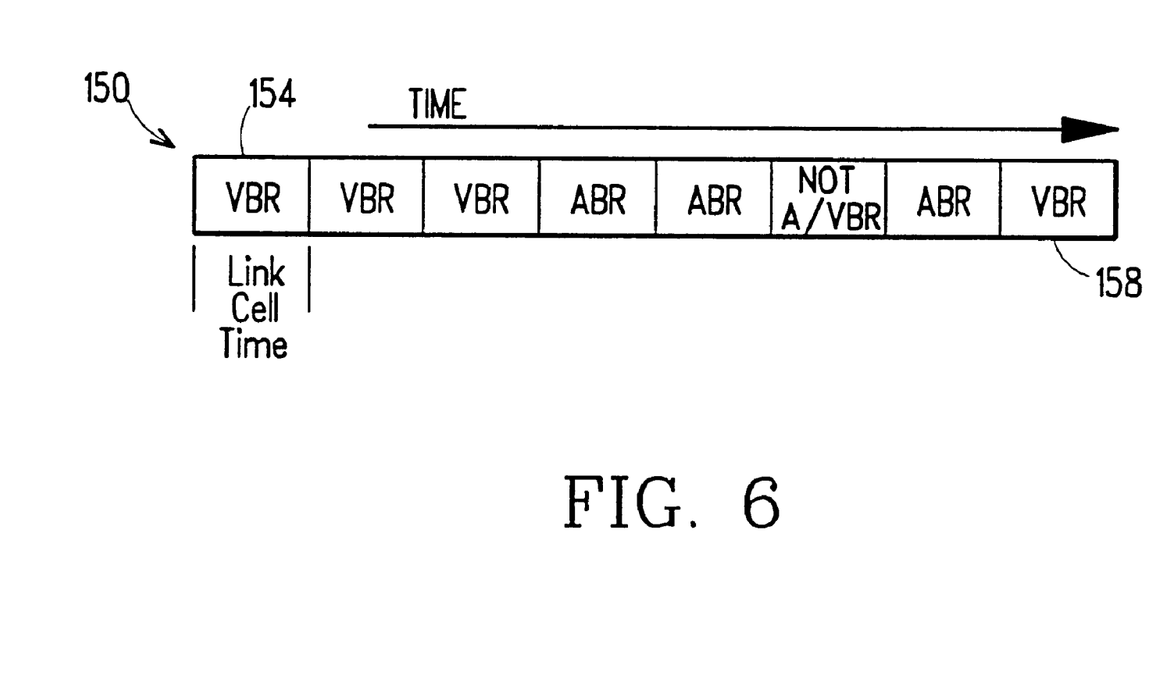
FIG. 6 shows a bandwidth measurement table with illustrative entries.

Referring also to the illustrative bandwidth table 150 of FIG. 6, each time a cell is transmitted by the switch 10, the scheduling category associated with the cell is written to the first location 154 of the bandwidth table 150 for that link. More particularly, when an ABR cell is dequeued, an entry is made in the bandwidth table specifying ABR traffic and, when a VBR cell is dequeued, an entry is made in the bandwidth table specifying VBR traffic. When either an allocated cell or a UBR cell is dequeued, a Not A/VBR or "null" entry is made in the bandwidth table, since it is not necessary to keep count of the number of allocated and UBR cells transmitted. This is because allocated bandwidth is ensured by the order in which the lists are scheduled and there is no particular bandwidth requirement for UBR cells.

Upon the transmission of subsequent cells, the entries in the bandwidth table 150 are shifted to the right so that, at the end of N cell times (where N is the number of locations in the bandwidth table), the table is full. Thereafter, when a cell is transmitted, the first location 154 in the bandwidth table is overwritten with the scheduling category associated with the presently transmitted cell and the remaining entries are shifted to the right, causing the last entry 158 to be removed from the table 150.

Two counters 58, 60 (FIG. 1) are provided in the control portion 52 of the FSPP 16 to count the number of cells of each scheduling category transmitted within the predetermined interval. In particular, one counter 58 counts the number of ABR cells transmitted over the predetermined interval (i.e., the number of ABR entries in the bandwidth table 150) and the other counter 60 counts the number of VBR cells transmitted over the predetermined interval. Each time an ABR cell or a VBR cell is dequeued and an entry made in the bandwidth table 150, the respective counter is incremented. When an entry is removed from the table, its scheduling category is read and the respective counter decremented. In this way, each counter 58, 60 maintains a running tally of the number of entries in the bandwidth table 150 of the respective scheduling category.

The FSPP 16 periodically compares the count maintained in each counter 58, 60 with the minimum bandwidth requirement for the 6respective scheduling category. For example, if ABR traffic is required to have 20%. of the link 30 to meet the ABR bandwidth requirement, then the count in the ABR counter 58 is compared to the required 20% bandwidth. If the bandwidth from the counter is greater than the required bandwidth, then the bandwidth requirement is met; whereas, if the bandwidth requirement from the counter is less than the required bandwidth, then the bandwidth requirement is not met.

The following Table 1 lists the order in which the scheduling lists are selected to permit link access to the queues 34 contained therein, with item 1 of Table 1 reflecting the highest priority list access operation and item 18 the lowest. Once a list is selected, all of the queues contained therein are serviced in the manner described above in conjunction with FIG. 5. A suffix of "high" relative to a list indicates that the bandwidth requirement for the respective scheduling category has not been met; whereas, a suffix of "low" indicates that the bandwidth requirement for that scheduling category has been met. For example, a list with a "high" suffix in Table 1 below will only be accessed if the bandwidth requirement has not been met.

TABLE 1

1. ABR flow control (High Priority: Timer expired)
2. PREFERRED 0
3. PREFERRED 1
4. PREFERRED 2
5. PREFERRED 3
6. VBR0 (High)
7. ABR flow control
8. ABR0 (High)
9. VBR1 (High)
10. VBR2 (High)
11. VBR3 (High)
12. ABR1 (High)
13. ABR2 (High)
14. ABR3 (High)
15. Round-robin 0: VBR0 (Low), ABR0 (Low) and UBR0
16. Round-robin 1: VBR1 (Low), ABR1 (Low) and UBR1
17. Round-robin 2: VBR2 (Low), ABR2 (Low) and UBR2
18. Round-robin 3: VBR2 (Low), ABR3 (Low) and UBR3

ABR flow control consists of feedback messages used for flow control for the ABR traffic type and refers to the update/check queues 142, 144. These queues contain update information for other switches 29. The update information indicates whether or not a particular TSPP 14 has the buffer capacity to presently accept data cells from the other switch.

In the illustrative embodiment, the update information contained in the queues 142, 144 will be transmitted before any other cell transmission if a predetermined interval has lapsed. Stated differently, an update cell generated from the update information is transmitted at least once during each such predetermined interval. To this end, update/check queue 142 is provided. According to item one of the link schedule Table 1, transmission of update information contained in the queue 142 has the highest priority in the event that the timer has expired. In particular, an ABR flow control timer in the FSPP 16 is loaded each time an update cell is transmitted and counts down thereafter. When this timer reaches a count of zero, another update cell is transmitted according to item one in Table 1 above.

In the event that the ABR flow control timer has not counted down to zero, update information will be transmitted with a priority higher than most of the dynamic bandwidth transmissions. To this end, the second update/check queue 144 has a priority after transmissions from the VBR0 list when the VBR bandwidth requirement is not met (i.e., item 6 in Table 1 above) but before all other dynamic bandwidth transmissions. This level of priority of the second update/check queue 144 is reflected by item 7 in the link schedule Table 1. It will be appreciated that although update/check queues 142, 144 are provided and scheduled in the manner described above in the illustrative embodiment, alternative schemes are possible for prioritizing the transmission of update information relative to transmission of other types of cells over a particular link.

The lists are given link access in accordance with the order set forth in the above Table 1. In the presently described ASIC-based switch implementation, list selection according to the above Table is performed simultaneously rather than consecutively. In particular, it is simultaneously determined which available list selection item has the highest priority. Considering items 8 and 9 in Table 1 as an example, it is simultaneously determined whether: (1) there exists an entry on the ABR0 list and the ABR bandwidth requirement has not been met; and (2) whether there exists an entry on the VBR1 list and the VBR bandwidth requirement has not been met. The highest priority one of these conditions which is true corresponds to the next list selection. It will be appreciated however, that the list selection sequence could alternatively be performed consecutively.

In view of the list selection priority specified in Table 1, it is apparent that all the preferred lists with allocated traffic for a link are scheduled with a priority above dynamic lists with dynamic traffic for that link. Newly received cells in a higher priority preferred list are transmitted before previously received cells in a lower priority preferred list. Also, the VBR service class achieves a preselected percentage of dynamic bandwidth before allowing the lower priority ABR service class to share in the dynamic bandwidth. Once ABR has achieved its preselected percentage, the remaining dynamic bandwidth is shared among VBR (low priority), ABR (low priority) and UBR in round-robin fashion.

Figure 7:
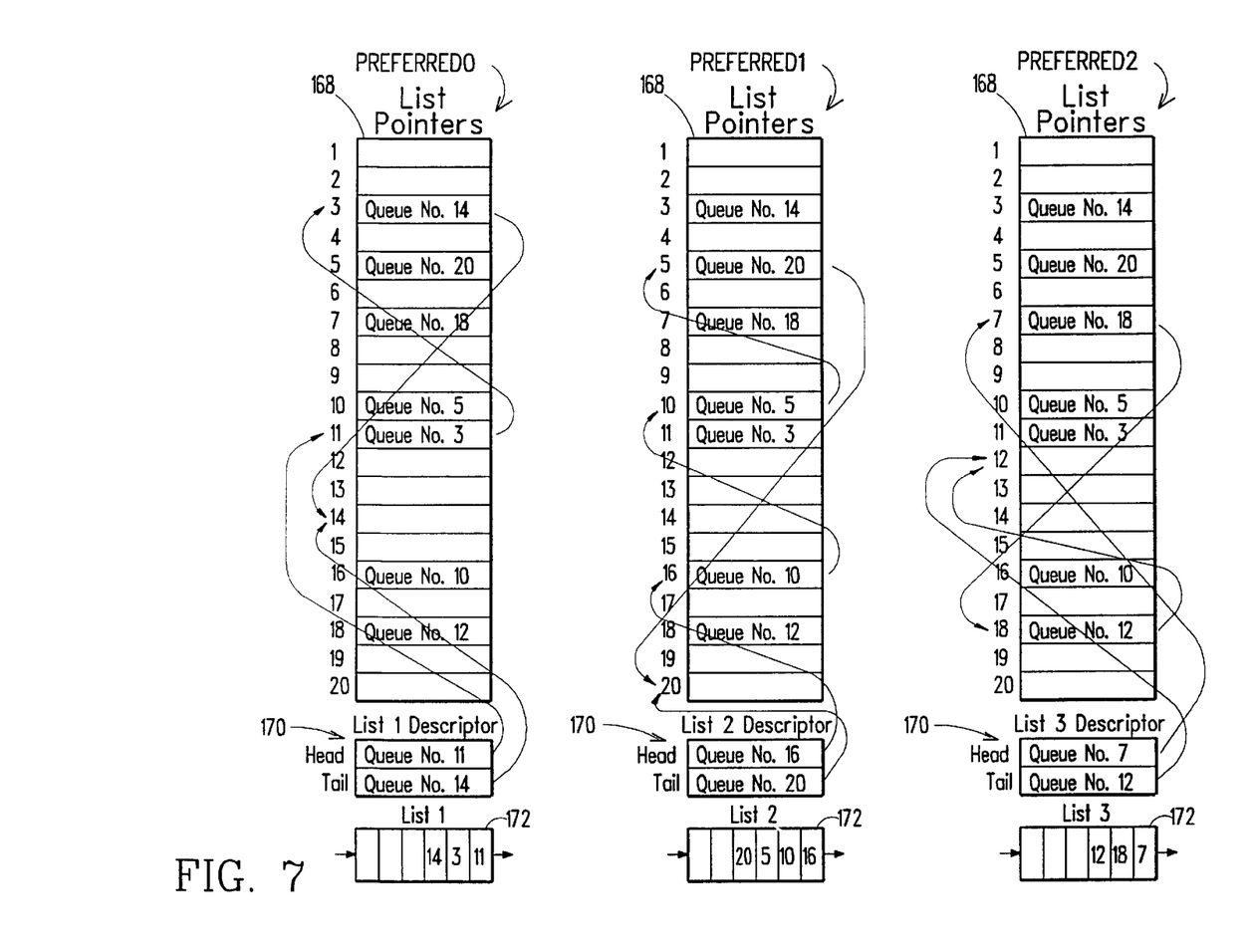
FIG. 7 shows an implementation of three illustrative lists.

Referring also to FIG. 7, the way in which the linked lists are implemented will be described in conjunction with three illustrative lists (e.g., PREFERRED0, PREFERRED1 and PREFERRED2). The logical construction of each list is labelled 172 in FIG. 7. For example, the PREFERRED0 list contains queue number 11 at the head of the list, followed by queue number 3 and finally queue number 14 at the tail of the list.

Recall that the lists are linked queue numbers, with each queue number on the list pointing to another queue number on the list using the queue number itself as a pointer. Associated with each list are list pointers 168 containing queue numbers and a list descriptor 170 which points to the head and tail of the list. Both the list pointers 168 and list descriptors 170 for each list are stored in the CR1 RAM 61 of the FSPP 16.

All of the preferred lists share the same set of list pointers 168. Likewise, all of the dynamic lists, ABR, VBR and UBR, share a common set of list pointers 168. The list descriptor 170, on the other hand, is different for each list and points to the head and tail of the respective list.

The queue number at the head of the list is used to index the list pointers 168. The queue number pointed to by the head of the list is the second entry in the list. Likewise, the queue number of the second entry is used to index the list pointers 168 and the queue number pointed to by this second entry is the third entry and so on until the queue number pointed to is equal to the queue number of the last entry (i.e., the tail of the list as specified in the list descriptor 170). Referring to the PREFERRED0 list for example, queue number 11 (i.e., the head of the list) is used to index the list pointers 168 to read the second entry in the list, or queue number 3. Thereafter, queue number 3 is used to index the list pointers 168 to read the queue number of the third entry on the list, or queue number 14. Queue number 14 is the last entry on the list since it is equal to the tail of the list as specified by the list descriptor 170.

A queue is added to the list by writing the queue number to the list pointer location indexed by the present tail of the list and replacing the present tail of the list in the list descriptor 170 with the queue number being added. A queue is removed from a list by indexing the list pointers 168 to find the queue number of the second list entry and replacing the present head of the list in the list descriptor 170 with the queue number of this second queue entry.

Having described preferred embodiments of the invention, it will be apparent to those skilled in the art that other embodiments incorporating the concepts may be used. For example, it will be appreciated that the apparatus and methods described herein in conjunction with link scheduling may be readily applied to switch port scheduling (i.e., the transport of data cells from a TSPP to one or more FSPPs). In particular, in the case of switch port scheduling, the lists would contain input queues 32 containing cells to be transmitted over the switch fabric 11 to one or more output ports 22 and the "links" become the connections through the switch fabric to which multiple input queues 32 contend for access. It is felt therefore that these embodiments should not be limited to the disclosed embodiments but rather should be limited only by the spirit and scope of the appended claims.

We claim:

1. A communications switch comprising:
    an input port operative to receive cells over an input link, each of said cells being associated with a respective scheduling category;
    an output port operative to transmit said cells from said switch over an output link, said output port comprising a plurality of queues associated with said output link, wherein each of said plurality of queues is adapted for enqueuing cells associated with at least one scheduling category;
    a switch fabric coupled between said input port and said output port;
    a memory comprising a plurality of lists, each of said lists associated with a respective scheduling category and adapted for listing ones of said plurality of queues; and
    a controller coupled to said memory and operative to schedule said lists in order to provide the queues listed in said lists with access to said output link, wherein said lists are scheduled based on the scheduling category associated with each of said lists and whether a bandwidth requirement associated with the respective scheduling category has been met.

2. The switch recited in claim 1 wherein said memory further comprises a bandwidth measurement table for storing entries indicating the scheduling category associated with cells transmitted during a predetermined interval.

3. The switch recited in claim 2 further comprising a counter for counting the number of entries in said bandwidth table for each scheduling category, wherein said counter is operative to determine whether said bandwidth requirement associated with a respective scheduling category has been met.

4. A method of resolving contention between plural queues having associated therewith cells for transmission over a link, the method comprising the steps of:
    associating each of said queues with at least one of a plurality of scheduling lists having a respective one of a plurality of scheduling categories associated therewith;
    measuring the bandwidth provided to each of said plurality of scheduling categories over a predetermined interval; and
    selecting one of said plurality of scheduling lists based on the measured bandwidth provided to the respective scheduling category.

5. The method recited in claim 4 wherein said bandwidth measuring step comprises the steps of:

storing a bandwidth measurement table comprising entries, each indicative of the one of said plurality of scheduling categories associated with a prior cell transmission; and maintaining a count of the number of entries, in said bandwidth measurement tables associated with each of said plurality of scheduling categories.

6. The method recited in claim 4 wherein said list selecting step further comprises the step of selecting one of said plural scheduling lists based on the scheduling category associated with said list.

7. The switch recited in claim 1 wherein at least one of said plurality of lists has a priority associated therewith within the respective scheduling category and wherein said plurality of lists are additionally scheduled based on said priority of said lists within the respective scheduling category, if any.

8. The switch recited in claim 1 wherein each of said plurality of lists comprises an entry having a first field for identifying one of said plurality of queues and a second field for pointing to another entry within the respective list.

9. The switch recited in claim 1 wherein each of said plurality of queues comprises a queue descriptor for identifying the at least one scheduling category associated with cells enqueued in said queue, a priority within said at least one scheduling category and said output link.

10. The switch recited in claim 9 wherein said queue descriptor further comprises a cell counts associated with said at least one scheduling category associated with cells engueued in said queues for storing a count of the number of cells in said queue associated with said at least one scheduling category.

11. A method of resolving contention between a plurality of queues for access to a link, the method comprising the steps of:

maintaining a plurality of lists associated with said link, each of said lists comprised of at least one entry for identifying one of said plurality of queues; and selecting one of said plurality of lists for providing link access to an identified one of said plurality of queues in accordance with a predetermined sequence of said plurality of lists.

12. The method recited in claim 11 wherein each of said plurality of lists has a scheduling category and priority within the respective scheduling category associated therewith and wherein said one of said plurality of lists is selected in accordance with said scheduling category and priority associated with said list.

13. The method recited in claim 12 wherein said one of said plurality of lists is selected in accordance with said predetermined sequence of said plurality of lists and whether a bandwidth requirement associated with the respective scheduling category has been met.

14. The method recited in claim 11 wherein said list maintaining step comprises the step of adding an entry to one of said plurality of lists when a cell is enqueued on said one of said plurality of queues if said one of said plurality of queues is not already identified in an entry in said one of said plurality of lists and said cell has the same scheduling category as said one of said plurality of lists.

15. The method recited in claim 11 wherein said list maintaining step comprises the step of deleting an entry from one of said plurality of lists when a cell is dequeued from said one of said plurality of queues if said one of said plurality of queues does not contain any cells having the same scheduling category as said one of said plurality of lists.

16. A switch coupled to a link, said switch comprising:

a plurality of queues adapted for enqueuing cells for transmission over said link;

a plurality of lists associated with said link, each of said plurality of lists adapted for maintaining at least one entry identifying one of said plurality of queues; and a controller for selecting one of said plurality of lists for providing link access to said one of said plurality of queues identified in an entry therein, wherein said one of said plurality of lists is selected in accordance with a predetermined sequence of said plurality of lists.

17. The switch recited in claim 16 wherein each of said plurality of lists has one of a plurality of scheduling categories and a priority within the respective scheduling category associated therewith.

18. The switch recited in claim 17 wherein said predetermined sequence is based on said scheduling category and said priority associated with said plurality of lists.

19. The switch recited in claim 17 further comprising a bandwidth measurement table for storing an average bandwidth provided to each of a plurality of scheduling categories over a predetermined interval.

20. The switch recited in claim 19 wherein said predetermined sequence is based on the average bandwidth provided to each of said plurality of scheduling categories over said predetermined interval.

* * * * *